United States Patent [19]

Gruensfelder

[11] Patent Number: 5,227,711
[45] Date of Patent: Jul. 13, 1993

[54] MOTOR CONTROLLER
[75] Inventor: Kurt Gruensfelder, Horsham, Pa.
[73] Assignee: Airtacs Corporation, Red Lion, Pa.
[21] Appl. No.: 838,568
[22] Filed: Feb. 19, 1992
[51] Int. Cl.[5] .............................................. H02P 5/40
[52] U.S. Cl. .................................... 318/807; 318/805; 318/803
[58] Field of Search ............... 318/800, 801, 809, 802, 318/806, 803, 807, 808, 810, 805, 723; 388/812, 815

[56] References Cited
U.S. PATENT DOCUMENTS

| | | | |
|---|---|---|---|
| 4,426,611 | 1/1984 | Espelage et al. | 318/803 |
| 4,475,150 | 10/1984 | D'Atre et al. | 318/806 |
| 4,520,298 | 5/1985 | Abbondanti | 318/805 |
| 5,010,287 | 4/1991 | Mukai et al. | 388/812 |

Primary Examiner—William M. Shoop, Jr.
Assistant Examiner—John W. Cabeca
Attorney, Agent, or Firm—Dann, Dorfman, Herrell and Skillman

[57] ABSTRACT

A motor controller accepts ac voltage at any frequency within a wide range and automatically generates an alternating polarity load-voltage having a preselected frequency, regardless of the frequency of the input voltage. The motor controller includes a dc-ac inverter which operates under the control of an EPROM to automatically generate the alternating polarity load-voltage at the desired frequency.

21 Claims, 11 Drawing Sheets

MOTOR CONTROLLER

BACKGROUND OF THE INVENTION

This invention relates to ac motor controllers, and in particular, to an ac motor controller which receives an ac source-voltage having a frequency within a wide range, and automatically provides a load-voltage to an ac motor at a substantially fixed frequency, regardless of the frequency of the ac source-voltage.

Large, mobile or transportable units for housing personnel or electronic equipment are often equipped with heavy duty air-conditioning systems. Such systems are usually powered by an ac source-voltage provided by the power utility in the location where the mobile units are deployed. The ac motors that drive the various components, such as fans and compressors, of the air conditioning units are designed to operate a particular frequency of ac voltage. However, the frequency of the local power utility's line voltage is not always compatible with the requirements of the ac motors of the mobile unit air conditioning systems. The problem is particularly acute when such mobile units are deployed overseas where the power frequency can change from country to country.

Manually operated motor controllers or frequency converters have been used to permit the air conditioning systems on such mobile units to be used with a range of power frequencies. However, such manual controllers leave much to be desired because they rely on the operator to properly set the controller to provide the proper frequency conversion and because the frequency range for which they are useful is relatively limited.

SUMMARY OF THE INVENTION

The aforementioned drawbacks associated with manually operated motor controllers are resolved to a large degree by a motor controller according to the present invention. The motor controller of the present invention includes an ac to dc converter for converting the alternating polarity, source-voltage to a first dc voltage having a positive polarity and a second dc voltage having a negative polarity relative to the first dc voltage. The source-voltage has a source-frequency that may be within a wide frequency range, for example, from about 50 to about 400 Hz. The motor controller according to the present invention also includes a dc to ac inverter for generating an alternating polarity load-voltage from the first and second dc voltages. The dc to ac inverter is configured to automatically generate the load-voltage at a substantially fixed, load-frequency regardless of the source-frequency of the source-voltage.

In a preferred embodiment, the dc to ac inverter operates under the control of an EPROM. The load-frequency is preferably determined by a crystal-controlled oscillator which controls the operation of the EPROM.

In accordance with another feature of the present invention, the motor controller is programmed to start a motor "softly". That is, from a dead stop the motor controller applies only ½ the source voltage to the motor at ½ the steady-state load-frequency, thereby causing the motor to start at half-speed while still exerting sufficient torque to perform its task. This feature results in a significantly reduced starting current.

In accordance with another feature of the present invention, the motor controller includes fault detection and logic circuits for shutting down the load or inhibiting its start-up if one or more of the following conditions occur: (1) the source-voltage is above or below preset max. or min. limits; (2) the load current exceeds a preset limit; and (3) the temperature exceeds a preset limit.

BRIEF DESCRIPTION OF THE DRAWINGS

Further advantages and novel features of the present invention will be apparent from the following detailed description of the invention and the accompanying drawings wherein.

DETAILED DESCRIPTION

Figure 1:
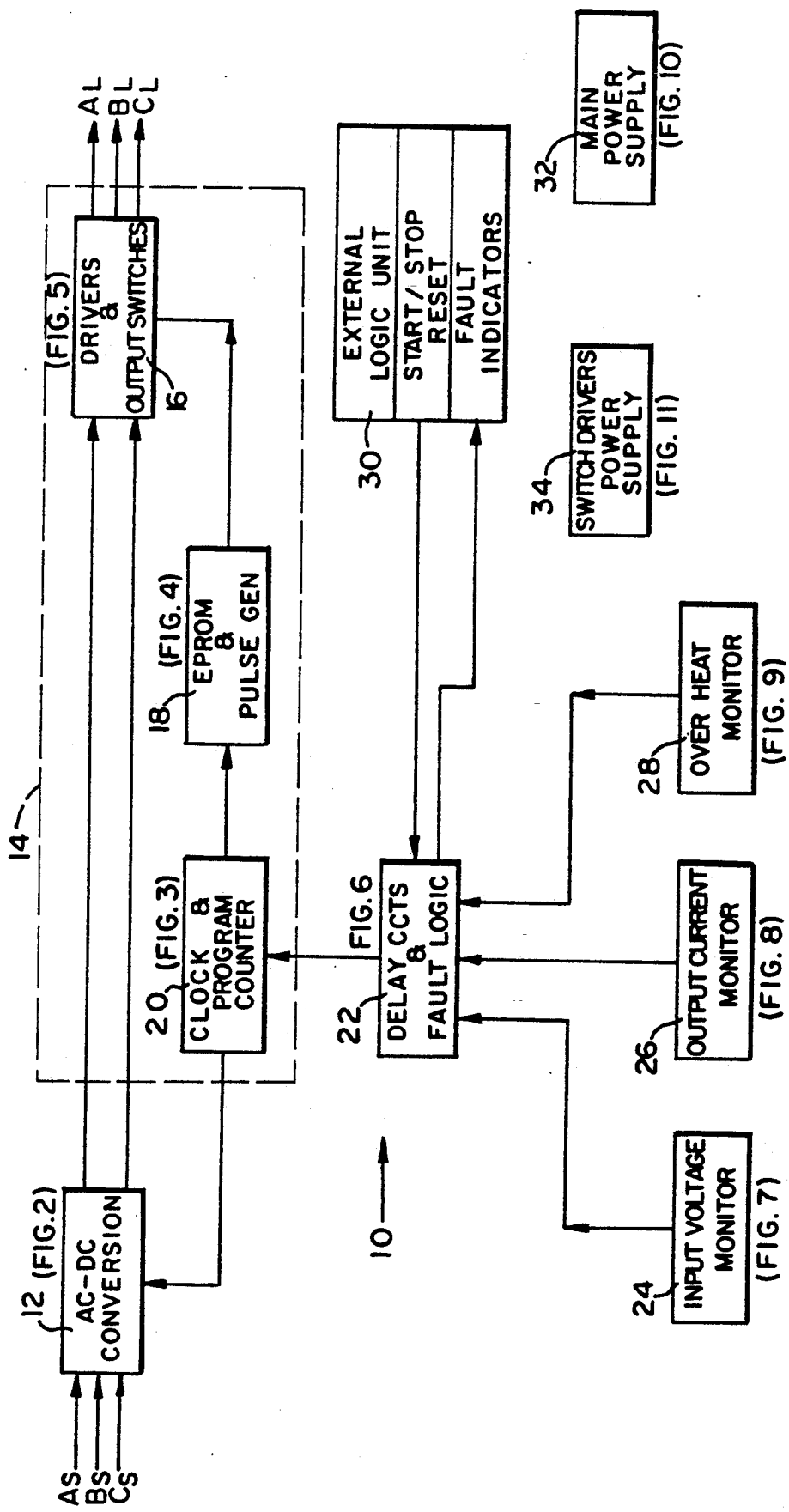
FIG. 1 is a block diagram of a motor controller according to the present invention.

Referring now to FIG. 1 of the drawings, there is shown a generalized functional block diagram of a motor controller 10 in accordance with the present invention. The motor controller 10 includes an ac to dc conversion circuit 12 having terminals formed to be connected to an ac source-voltage, represented in FIG. 1 by the three-phase ac voltage $A_S$, $B_S$, and $C_S$. The motor controller 10 also includes a dc to ac inversion circuit 14 having output terminals formed to be connected to a load, such as an ac motor. The dc—ac inversion circuit 14 includes a driver and output switch circuit 16 which operates under the control of an EPROM and pulse generator circuit 18. As described more fully hereinbelow, the driver and output switch circuit 16 includes the semiconductor, power switching devices and their associated drivers.

The dc—ac inversion circuit 14 also includes a clock and program counter circuit 20 which generates a clock signal for controlling the operation of the ac—dc converter 12 and the EPROM and pulse generator circuit 18.

In order to provide reliable operation during start-up, restart, or steady state conditions, motor controller 10 includes a delay and fault logic circuit 22 which receives inputs from a voltage monitor circuit 24, an output current monitor circuit 26, an overheat monitor circuit 28, and/or an external logic unit 30. The external logic unit 30 is not a part of the motor controller according to the present invention. It is shown and described herein because it provides start, stop, and reset signals to the motor controller 10 and receives fault signals from the voltage monitor 24, current monitor 26, or over heat monitor 28 to provide fault indication to the system operator.

The motor controller 10 according to the present invention further includes a main power supply 32 and a separate power supply 34 for the power switch drivers.

In operation, the motor controller 10 according to the present invention receives single-phase or polyphase, alternating polarity, source-voltage, such as from the local power company. The source-voltage can be at any frequency, but is preferably within the range of 50–400 Hz. The ac—dc conversion circuit 12 rectifies and converts the ac source-voltage to a positive polarity dc voltage and a negative polarity dc voltage. The dc—ac inversion circuit 14 automatically generates an alternating polarity load-voltage, single-phase or polyphase, from the positive and negative polarity dc voltages, at a substantially fixed, preselected frequency, preferably 61 Hz. Under steady state conditions, the frequency of the load-voltage does not change, regardless of the frequency of the source-voltage. The frequency of the load-voltage is determined by the clock signal generated in the program counter module 20. Thus, the frequency of the load-voltage is preselectable and independent of the frequency of the source-voltage.

Figure 2:
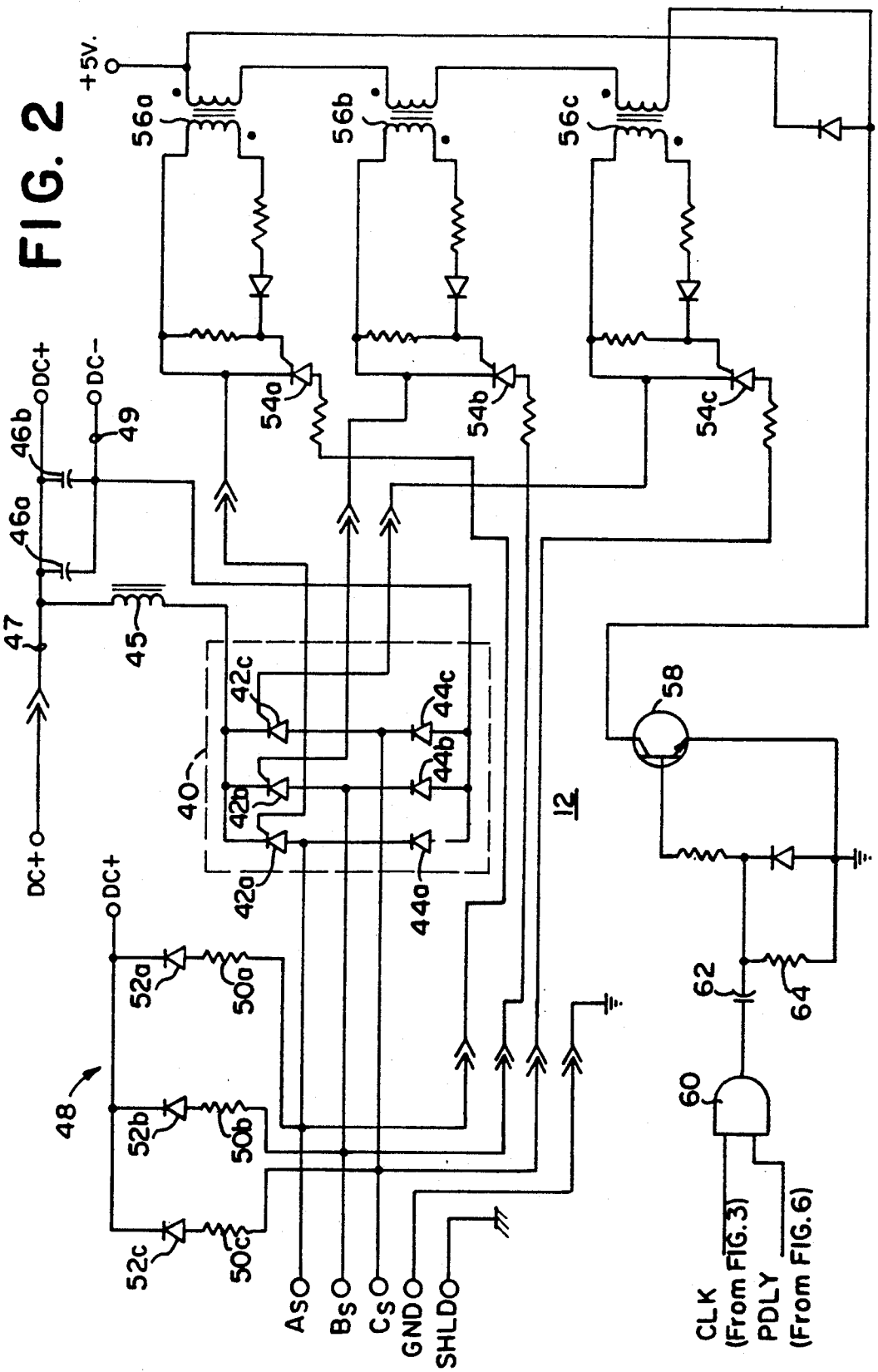
FIG. 2 is a partial schematic diagram of a preferred embodiment of the ac to dc converter circuit of the motor controller of FIG. 1.

Shown in FIG. 2 is a preferred arrangement for the ac-dc conversion circuit 12 of FIG. 1. A bridge rectifier module 40 contains the main power rectifying devices, embodied as silicon controlled rectifiers (SCR's) 42a, 42b, and 42c. The anodes of the SCR's 42a, 42b, and 42c are connected to the ac source-voltage. The cathodes of the SCR's 42a, 42b, and 42c are connected through an inductor 45 to the DC+ bus 47 for charging the capacitors 46a and 46b. Inductor 45 limits the charging current to the capacitors 46a and 46b and filters the voltage ripple on the DC+ bus.

The anodes of SCR's 42a, 42b, and 42c are also connected to the cathodes of diodes 44a, 44b, and 44c, respectively. The anodes of diodes 44a, 44b, and 44c are connected to the DC— bus 49 of the ac to dc conversion circuit 12.

A start-up rectifier circuit 48 is connected to the ac input terminals for providing a reduced charging current to capacitors 46a and 46b when the motor controller 10 is first energized, i.e., when it is connected to the source-voltage. Each phase of the start-up rectifier circuit 48 includes a resistor 50a, 50b, or 50c connected between the ac input terminals and the anodes of corresponding diodes 52a, 52b, or 52c, respectively. The cathodes of diodes 52a, 52b, and 52c are connected to the DC+ bus 47.

The main SCR's 42a, 42b, and 42c are controlled by the slave SCR's 54a, 54b, and 54c which in turn are operated by pulses received via the isolating transformers 56a, 56b, and 56c, respectively, from transistor 58. The base of transistor 58 is connected to the output of a two input AND-gate 60 through a differentiating circuit consisting of capacitor 62 and resistor 64. AND-gate 60 is connected to receive a clock signal CLK at one of its inputs and a plug-in delay signal PDLY at the other input. The clock signal CLK consists of a series of periodic pulses having a preselected pulse-width. As described more fully hereinbelow, signal PDLY changes to a logic high or 1 a preselected time period after the motor controller 10 is connected to the source-voltage. When PDLY becomes a logic 1, the output of AND-gate 60 is the same as clock signal CLK.

The output signal of AND-gate 60 is differentiated by the differentiating circuit of capacitor 62 and resistor 64 to provide a series of spikes which periodically drive transistor 58 into saturation. When transistor 58 saturates, a narrow pulse is generated at the primary windings of the isolating transformers 56a, 56b, and 56c. The secondaries of the transformers 56a, 56b, and 56c are connected in a known manner to the gates of the slave SCR's 54a, 54b, and 54c, respectively. The anodes of the slave SCR's 54a, 54b, and 54c are connected to respective phases of the ac source voltage and the cathodes are connected to the gates of the main SCR's 42a, 42b, and 42c, respectively. The pulses appearing at the secondaries of transformers 56a, 56b, and 56c trigger the slave SCR's 54a, 54b, and 54c which in turn respectively trigger the main SCR's 42a, 42b, and 42c. When the ac-dc converter circuit 12 is operating, positive polarity dc voltage is supplied to the DC+ bus 47 and negative polarity dc voltage is supplied to the DC— bus 49.

Figure 3:
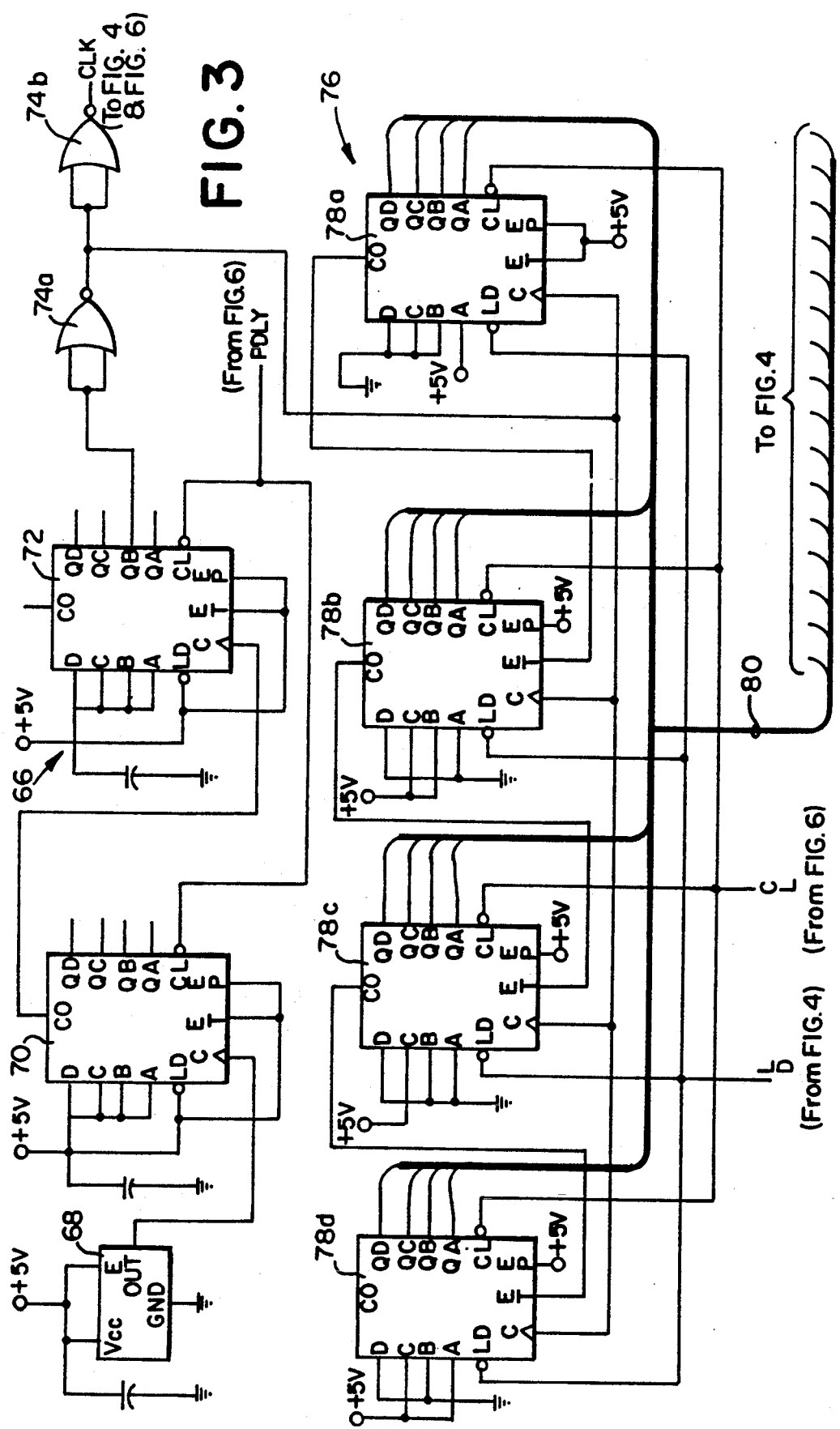
FIG. 3 is a partial schematic diagram of a preferred embodiment of the clock and program counter circuit of the motor controller of FIG. 1.

Referring now to FIG. 3, there are shown a clock signal generating circuit 66 and a program counter circuit 76, which together constitute the clock and program counter circuit 20 shown in FIG. 1. The clock signal CLK is generated by the clock generating circuit 66. An oscillator 68, preferably a crystal controlled type oscillator, generates a high frequency, e.g., 1.4 megahertz, signal. A pair of flip-flops 70 and 72 are interconnected in a known manner to form a divider which divides the frequency of the output signal of the oscillator 68 by a preselected number. The output of oscillator 68 is connected to the C input of flip-flop 70. In the preferred embodiment shown, flip-flops 70 and 72 are configured to divide the 1.4 megahertz signal of oscillator 68 by the number 64. The signal output at terminal QB of flip-flop 72 has a period of 45.5 microseconds. The NAND-gates 74a and 74b are connected in a known manner to provide a time shift between the signal output of NAND-gate 74a and the signal output of NAND-gate 74b, the latter signal being provided to other parts of the motor controller circuit as the clock signal CLK.

The output of NAND-gate 74a is connected to the C inputs of flip-flops 78a, 78b, 78c, and 78d which are connected in a known manner to form a synchronous binary counter. The counter circuit 76 is configured to count from decimal 1 to decimal 65536. The count of each of the respective flip-flops 78a, 78b, 78c, and 78d is output from the terminals QA, QB, QO, and QD of each of the respective flip-flops onto the address bus 80.

The input terminals A, B, C, and D of the respective flip-flops 78a, 78b, 78c, and 78d are connected such that the counter 76 is preset to a specific count when the signal LD is a logic low or zero. In the preferred embodiment shown, the preset count is decimal 21,601, the significance of which will become apparent in the light of the description that follows hereinbelow. A trouble signal CL is provided to each of the flip-flops 78a, 78b, 78c, and 78d for enabling or disabling the counter circuit 76. When the motor connected to the motor controller of the present invention is being shut down or is not running, the signal CL is a logic 0 or low, the counter circuit 76 is disabled. When the motor is started and there are no fault conditions, the signal CL changes to a logic 1 or high and the counter circuit 76 is enabled.

Figure 4:
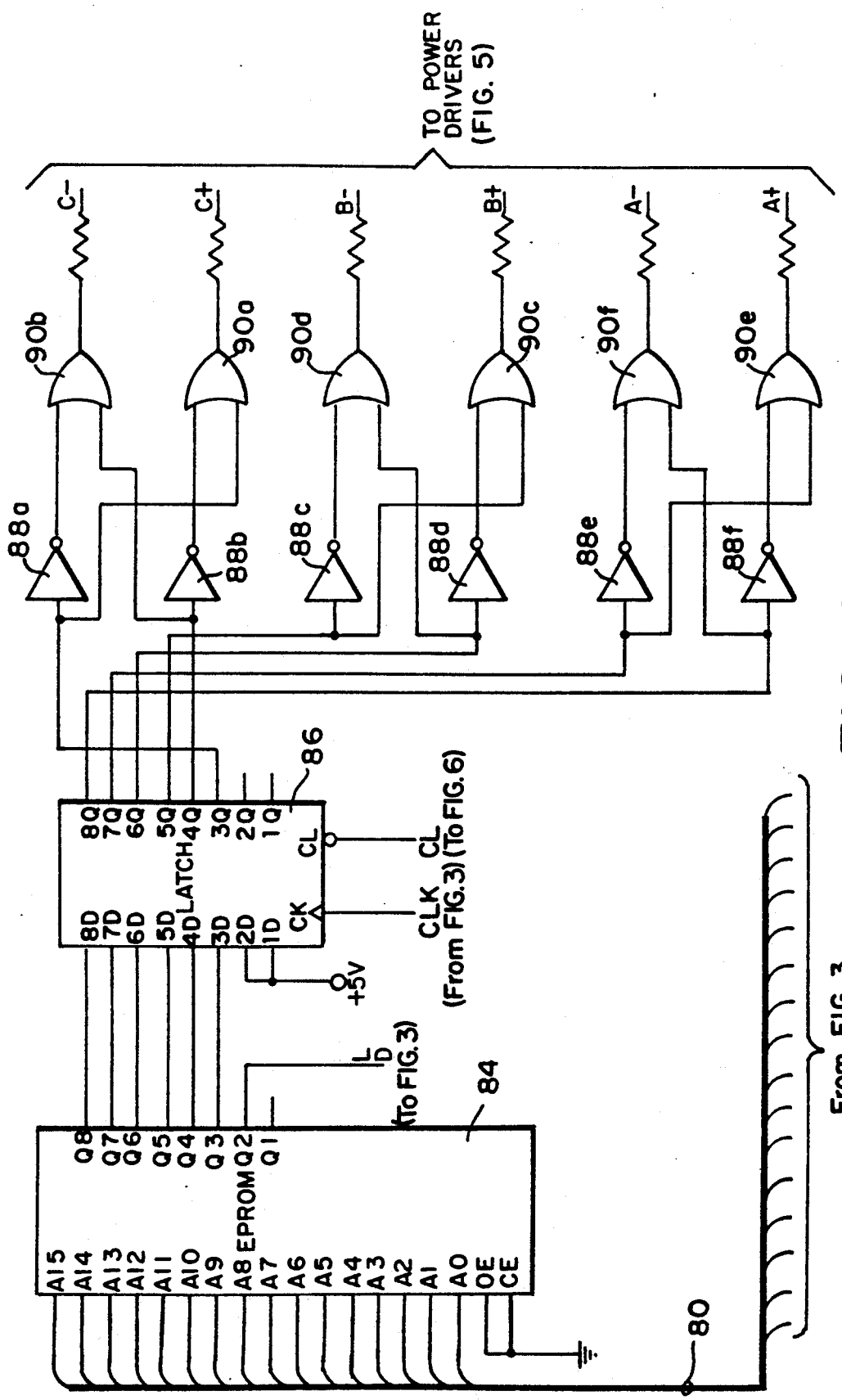
FIG. 4 is a partial schematic diagram of a preferred embodiment of the EPROM and pulse generator circuit of the motor controller of FIG. 1.

Referring now to FIG. 4, there is shown a preferred arrangement for the EPROM and pulse generator circuit 18 shown in FIG. 1. The address bus 80 is connected to the address inputs A0-A15 of a memory device 84, which is preferably in the form an electrically programmable read only memory (EPROM). The EPROM 84 stores a plurality of binary data words, each of which contains switch condition codes that define an open or closed condition for each of the power switches in the driver and output switch circuit 16 of the dc to ac inversion circuit 14. The output ports Q3-Q8 of EPROM 84 are connected to the input terminals 3D-8D of a data latch or buffer 86. Data latch 86 is connected to receive the clock signal CLK at its OK terminal and the signal CL at its CL terminal. The output terminals 3Q-8Q of data latch 86 are connected to the inputs of inverters 88a-88f, respectively, and to one of the inputs of each of OR-gates 90a-90f, respectively. The output of inverter 88a is connected to the other input of OR-gate 90b and the output of inverter 88b is connected to the second inverter 88c is connected to the second input of OR gate 90d, and the output of inverter 88d is connected to the second input of OR- gate 90c. The output of inverter 88e is connected to the second input of OR-gate 90f and the output of inverter 88f is connected to the second input of OR- gate 90e. The above-described cross connections between inverters 88a-88f and OR-gates 90a-90f prevent pulses from appearing simultaneously on lines C− and C+, or lines B− and B+, or lines A− and A+.

The data words stored in EPROM 84 in the preferred embodiment shown, each contain six data bits and one control bit, the control bit being the least significant bit in the data word. Each of the data bits defines the condition, open or closed, of one of the power switches over a given time interval. A logic zero in one of the data bits indicates that the corresponding power switch is off or non-conducting. A logic one in a data bit indicates that the corresponding power switch is on or conducting. The control bit appears at terminal Q2 of memory device 84 to provide the control signal LD for resetting the program counter circuit 76 to the preselected count value.

For steady state operation, it is only necessary to define the switch conditions for one cycle and provide means for repeating the cycle, because the load-voltage waveform is periodic, i.e., it repeats every 360 degrees. For example, in an embodiment in which the switch conditions are defined in one degree increments, 360 data words are necessary. The 360th data word contains a control bit that resets the program counter to the count that corresponds to the EPROM address that contains the first data word.

A particularly advantageous feature of the motor controller according the present invention is that it can start an electric motor "softly". In other words, the electric motor is started at a reduced voltage in order to reduce the strain on the electric motor and its mechanical load and to significantly lower the inrush current. To that end, the motor controller provides a reduced load-voltage, preferably 50% of the steady state load-voltage, to the electric motor for a brief time period during startup. During that time period the load-frequency is reduced to 50% of the steady-state load-frequency.

A separate sequence of data words is used by the motor controller to provide the reductions in load-voltage and frequency. Reducing the effective load-voltage by 50% is accomplished by reducing the "on" time of the various power switches by 50%. Reducing the load-frequency is accomplished by doubling the number of data words that define each positive-polarity portion and each negative-polarity portion of the load-voltage waveform.

In an embodiment in which the steady state load frequency is 61 Hz, the switch conditions are defined in one degree increments, and the reduced startup voltage period is about 1 second, 21,600 data words are required. Accordingly, the first 21,600 addresses of the EPROM contain the data words that define the power switch conditions for the reduced voltage period. The first data word defining the power switch conditions for the steady state running period is stored at address 21,601 of the EPROM.

The data words stored in the EPROM 84 are generated in the proper sequence by means of a computer program. A copy of the source code for a preferred computer program is included as part of the present specification at pages 23-28. When executed, the program generates a data file which is then loaded into an EPROM programmer, whereby the EPROM 84 is programmed. The data file generated by the computer program contains the individual data words for each of the addresses or program steps which are used by the motor controller according to the present invention while in operation.

Figure 5:
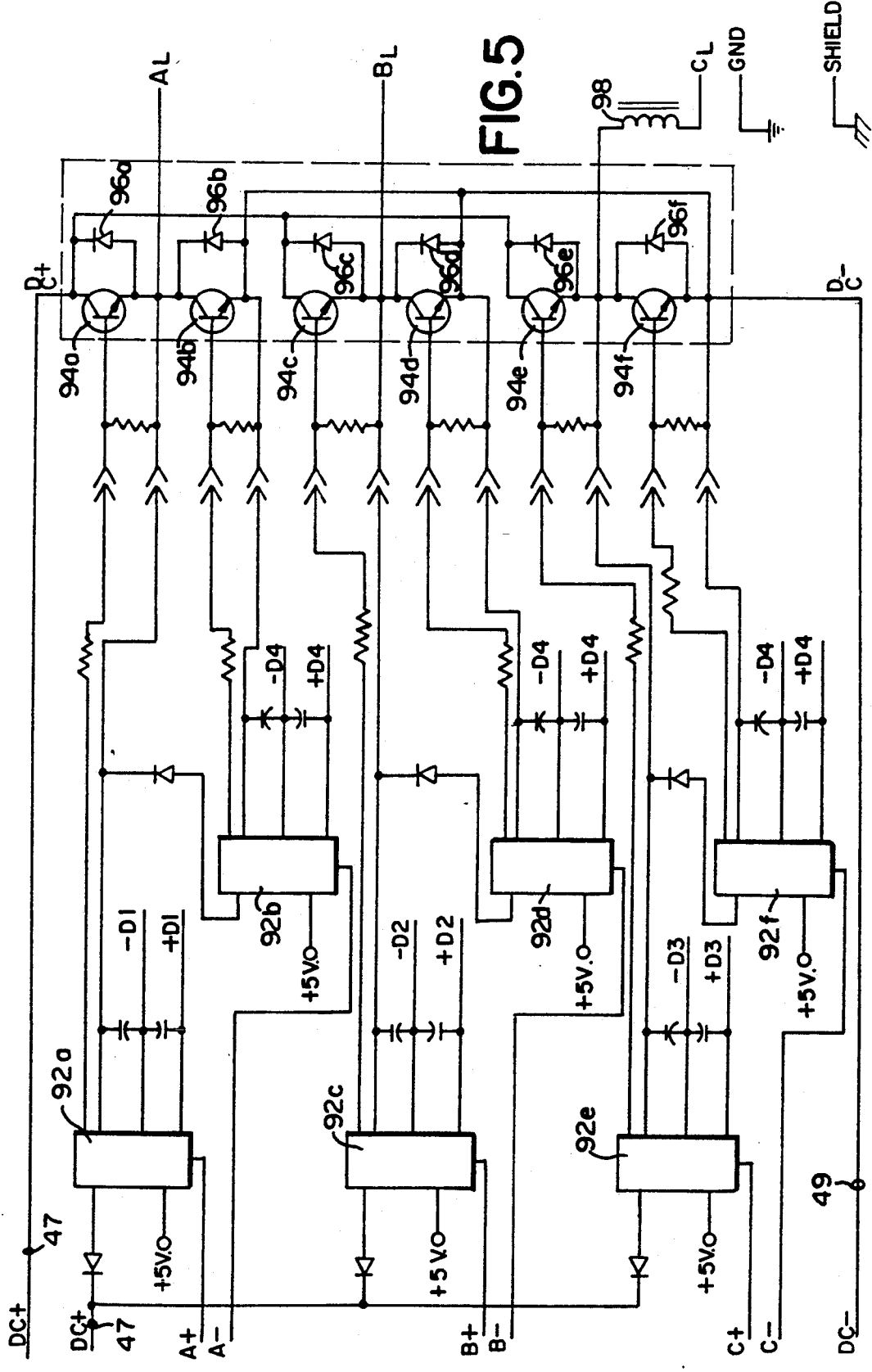
FIG. 5 is a partial schematic diagram of a preferred embodiment of the driver and output switch circuit of the motor controller of FIG. 1.

The output terminals of the OR-gates 90e, 90f, 90c, 90d, 90a, and 90b are connected respectively to the input terminals of the driver modules 92a, 92b, 92c, 92d, 92e, and 92f, respectively, in the power driver module 16, as shown in FIG. 5. The driver modules 92a-92f are preferably hybrid integrated circuits which are internally opto-coupled to isolate the low voltage input signal and bias voltage from the high level DC+ bus voltage. A preferred driver module is the model EXB850 hybrid IC driver manufactured by Fuji Electric Company, Ltd. of Japan.

The output terminals of the driver modules 92a-92f are connected to the gate terminals of insulated gate bipolar transistors 94a-94f, respectively. The bipolar transistors 94a-94f are the preferred power switching devices of the dc—ac inversion circuit 14. The collector terminals of power switches 94a, 94c, and 94e are connected to the high voltage DC+ bus 47 and the positive polarity portion of the respective load phase-voltages is provided at the emitter terminals of bipolar transistors 94a, 94c, and 94e when the respective power switch is closed. The emitter terminals of power switches 94b, 94d, and 94f are connected to the high voltage DC− bus 49 and the negative polarity portion of the respective load phase-voltages is provided at the collector terminals 94b, 94d, and 94f when the respective power switch is closed. It is readily apparent that power switches 94a and 94b are connected in series between the DC+ bus 47 and the DC− bus 49. Power switches 94c and 94d are similarly connected, as are power switches 94e and 94f. During operation of the motor controller according to the present invention, the load phase-voltages, $A_L$, $B_L$, and $C_L$, are provided as alternating polarity voltages at the interconnection points of the respective pairs of power switches.

Shunting diodes 96a-96f are connected across the collector and emitter terminals of each of the power switches 94a-94f to provide a current path through the main capacitors 46a and 46b during commutation. The current paths provided by the shunting diodes prevent damage to the main rectifying SCR's 42a, 42b, or 42c and diodes 44a, 44b, or 44c which could otherwise be caused by high voltage, back-emf's generated by the inductive load during the brief interval when all of the power switches for a particular phase are open or non-conducting.

A current transformer 98 is connected in the C phase conductor for monitoring the output current of the motor controller. The secondary winding of transformer 98 is connected to the current monitoring circuit 26 to provide an input thereto that is representative of the phase current during start-up of a motor connected to the motor controller according the present invention.

Figure 6:
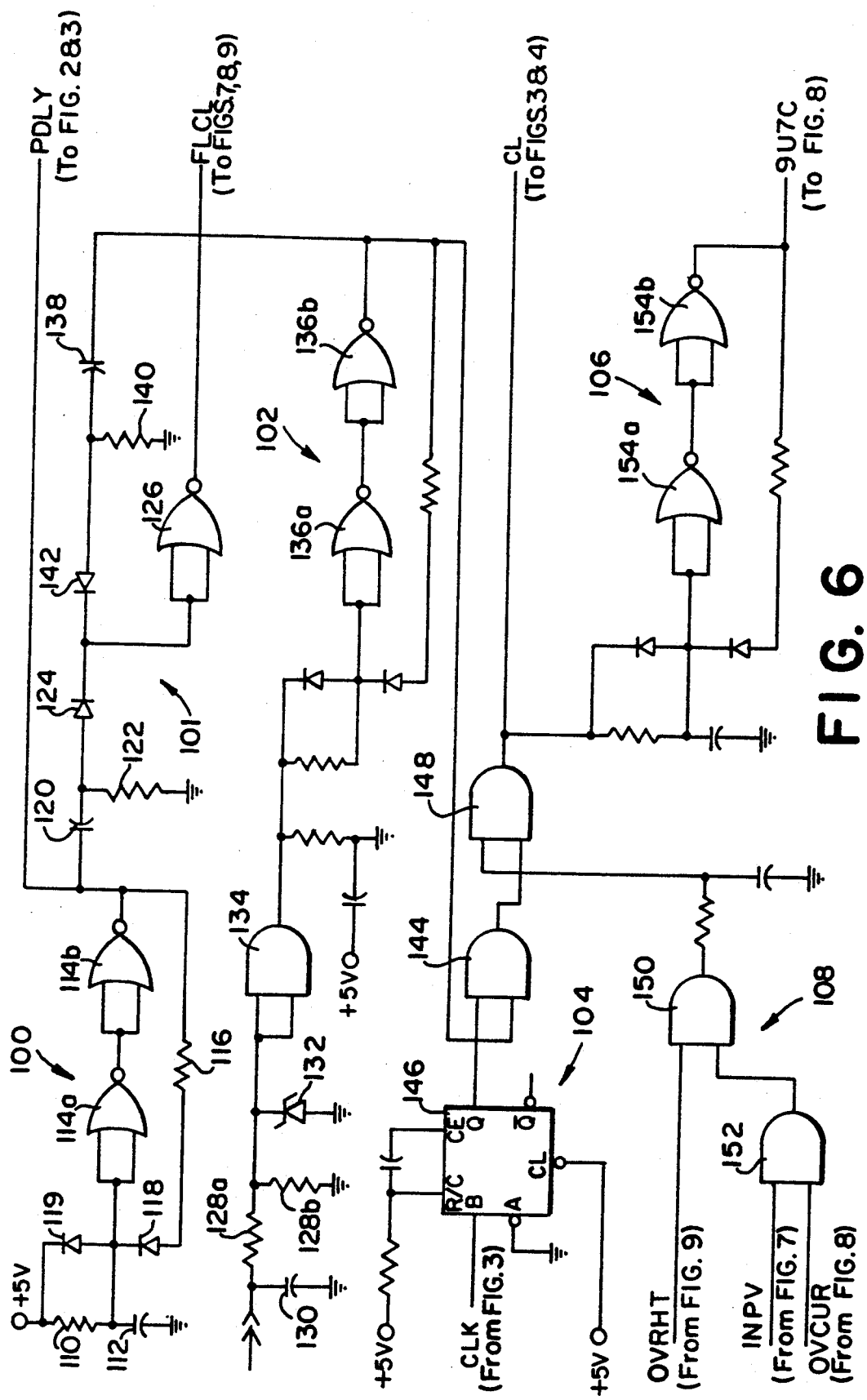
FIG. 6 is a partial schematic diagram of a preferred embodiment of the delay and fault logic circuit of the motor controller of FIG. 1.

Referring now to FIG. 6, there is shown a preferred arrangement for the delay and fault logic circuit 22 of the motor controller according to the present invention. The time delay circuits include the plug-in delay circuit 100, the start-up delay circuit 102, and the start-up-overcurrent delay circuit 106. The fault logic circuits include the fault clear circuit 101, the clock monitoring circuit 104, and the fault monitoring circuit 108.

The plug-in delay circuit 100 is a "one time only" delay circuit having a preselected time delay preferably of about one to two seconds after the motor controller is initially energized. As described above, the plug-in delay circuit 100 provides the signal PDLY which enables the operation of the ac—dc conversion circuit 12. The plug-in delay circuit 100 includes an RC timing network consisting of resistor 110 and capacitor 112 which are connected in series between the +5 volt power supply and ground. The delay time is a function of the values of resistor 110 and capacitor 112. The junction between resistor 110 and capacitor 112 is connected to both inputs of NOR-gate 114a, the output of which is connected to both inputs of NOR-gate 114b. The output of NOR-gate 114b is connected through resistor 116 and diode 118 to the inputs of NOR-gate 114a to reinforce the charging current into capacitor 112 when the signal at the output terminal of NOR-gate 114b is a logic one or high. A second diode 119 is connected across resistor 110 to permit capacitor 112 to discharge rapidly when the motor controller is de-energized.

The signal PDLY which appears at the output of NOR-gate 114b resets the "divide by 64" clock counter 66 shown in FIG. 3 and enables the main rectifier SCR's as described above in connection with FIG. 2.

The output of NOR-gate 114b is also connected to the inputs of NOR-gate 126 through a differentiating network consisting of capacitor 120 and resistor 122 and buffing diode 124. The differentiating network of capacitor 120 and resistor 122 provides a positive going pulse to the input of NOR-gate 126 when the output of NOR-gate 114b becomes a logic one. The output of NOR-gate 126, which is normally a logic one, changes to logic zero for a short while after receiving the pulse. The logic zero provided at the output of NOR-gate 126 is the signal FLCL which interrogates the various fault monitoring circuits and clears any previous faults which may have occurred and are still latched in any of the various fault monitoring circuits.

The start-up delay circuit 102 is connected to the external logic unit 30 and provides a preselected time delay after the receipt of a START signal from the external logic unit 30. The length of the time delay is selected to permit the motor to coast down to a slow speed or come to a complete stop before it can be restarted. The 12 volt START signal from the external logic unit is applied across the voltage regulating network consisting of capacitor 130, resistors 128a and 128b, and zener diode 132 which condition the START signal and reduce its amplitude to about +5 volts dc. The +5 volts dc signal is applied to the input terminals of AND-gate 134 the output of which is connected to the NOR-gates 136a and 136b of start-up delay circuit 102. Start-up delay circuit 102 is configured similarly to the plug-in delay circuit 100 and operates in essentially the same manner except that it has a longer time delay, preferably about three seconds.

The output of NOR-gate 136b of start-up delay circuit 102 is connected to the input terminals of NOR-gate 126 of the fault clear circuit 101 through the differentiating network of capacitor 138, resistor 140 and buffing diode 142. That arrangement generates a second FLCL signal (logic low or zero) to reinterrogate and-/or reset any of the fault monitoring circuits.

The output of NOR-gate 136b is connected to one of the inputs of AND-gate 144 in the clock monitoring circuit 104. The clock monitoring circuit 104 includes a monostable multivibrator 146 which receives the clock signal CLK at its B input terminal. The Q output terminal of monostable multivibrator 146 is connected to the second input of AND-gate 144. The output of AND-gate 144 is connected to one of the inputs of AND-gate 148. The other input of AND-gate 148 is connected to the output of AND-gate 150, one of the inputs of which is connected to receive the signal OVRHT from the overheat monitor circuit 28. The other input of AND-gate 150 is connected to the output of AND-gate 152. One of the inputs of AND-gate 152 is connected to receive the signal INPV from the input voltage monitor circuit 24 and the other input is connected to receive the signal OVCUR from the output current monitor circuit 26. The output of AND-gate 148 provides the trouble signal CL which resets and disables the program counter 76 when it is a logic zero, thereby shutting down the system or inhibiting its start-up. The signal CL enables the program counter 76 and the EPROM latch 86 when it is a logic one, thereby permitting the system to start-up and run.

When a motor load connected to the motor controller according to the present invention initially starts up, there is an in-rush current of approximately three times the normal, or steady-state, load current. Such a large current would activate the overcurrent monitor circuit causing the system to shut down. The start-up-overcurrent delay circuit 106 is provided to disable the output current monitor circuit 26 for a short period of time while the motor accelerates to full speed. The output of AND-gate 148 is connected to both inputs of NOR-gate 154a, the output of which is connected to both inputs of NOR gate 154b. As is readily apparent, the start-up-overcurrent delay circuit 106 is essentially similar to the plug-in delay circuit 100 with the exception that it is configured to provide a longer time delay, preferably up to four seconds in duration. The output of NOR-gate 154b provides the start-up-overcurrent delay signal 9U7C to disable the output current monitor circuit 26 for the desired time delay.

Figure 7:
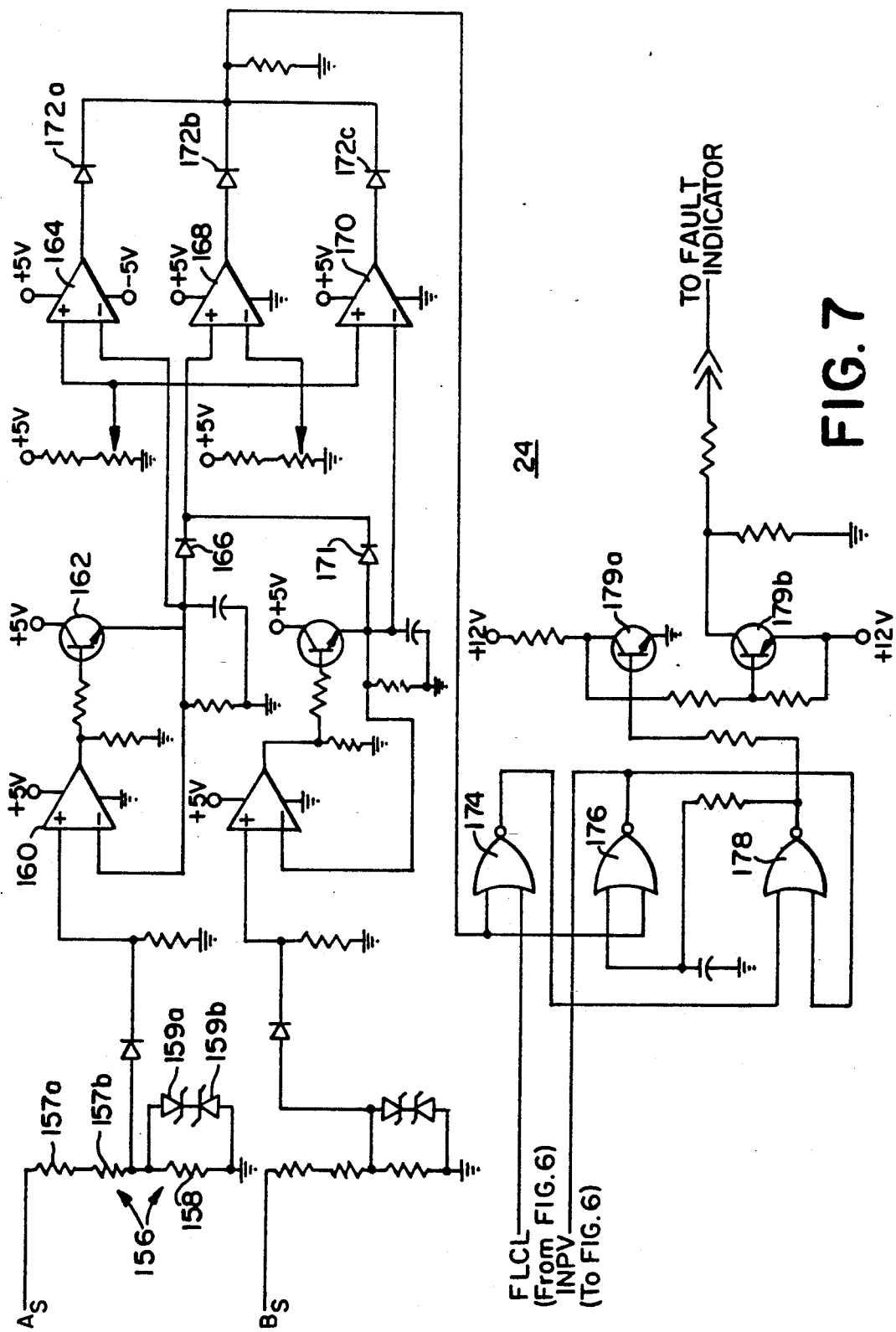
FIG. 7 is a partial schematic diagram of a preferred embodiment of the input voltage monitor circuit of the motor controller of FIG. 1.

A preferred arrangement for the input voltage monitor circuit 24 is shown in FIG. 7. The input voltage monitor circuit is designed to shut down the system when the source voltage is either in an overvoltage condition or an undervoltage condition. A voltage divider 156 consisting of resistors 157a and 157b and 158, is connected across the A-phase of the ac source-voltage. A pair of zener diodes 159a and 159b are connected cathode to cathode across resistor 158. The voltage divider 156 provides a preselected fraction of the phase voltage, A,, to the "+" input terminal of op-amp 160. The output of op-amp 160 is connected to the base of transistor 162 to form a peak detecting circuit. The output of the peak detecting circuit is connected to the "−" input of comparator 164 and to the "+" input terminal of comparator 168 through a buffing diode 166. An identical voltage divider and peak detection circuit is provided for the phase voltage B, of the ac source-voltage. The output of the B-phase peak voltage detecting circuit is connected to the "−" input of comparator 170 and through the buffing diode 171 to the "+" input terminal of comparator 168. The comparators 164 and 170 are set to provide a logic one or high at their output terminals when the phase-to-neutral voltage of either the A-phase or B-phase of the source voltage drops below a preselected value, for example, 165 volts. The comparator 168 is set to provide a logic one at its output if the phase-to-neutral voltage of either phase is above a preselected value, for example, 240 volts.

The outputs of the comparators 164, 168 and 170 are buffed together through diodes 172a, 172b, and 172c to one of the inputs of NOR-gate 174 and one of the inputs of NOR-gate 176. The second input of NOR-gate 174 is connected to receive the fault clear signal FLCL from the fault clear circuit 101 shown in FIG. 6. The second input of NOR-gate 176 is connected to the output terminal of NOR-gate 178. The output of NOR-gate 174 is connected to one of the inputs of NOR-gate 178 and the output of NOR-gate 176 is connected to the second input of NOR-gate 178. The output of NOR-gate 176 is also connected to the fault detector circuit 108 shown in FIG. 6 to provide the input voltage condition signal INPV.

It will be appreciated that the NOR-gates 174, 176, and 178 are connected in a latching arrangement such that if a logic one appears on either of the inputs of NOR-gates 174 and 176 as a result of an overvoltage or undervoltage condition, then a logic one appears at the output of NOR-gate 178. Consequently, a logic zero appears at the output of NOR-gate 176. The outputs of NOR-gates 176 and 178 will remain unchanged even if either of the inputs to NOR-gates 174 and 176 change from a logic one to a logic zero. In order to change the output state of NOR-gates 176 and 178 the signal FLCL must change to a logic zero. The output of NOR-gate 178 is connected to the base of transistor 179 which in turn is connected to the base of transistor 179b to generate a 12 volt output signal to be provided to a fault indicator located in the external logic unit 30.

Figure 8:
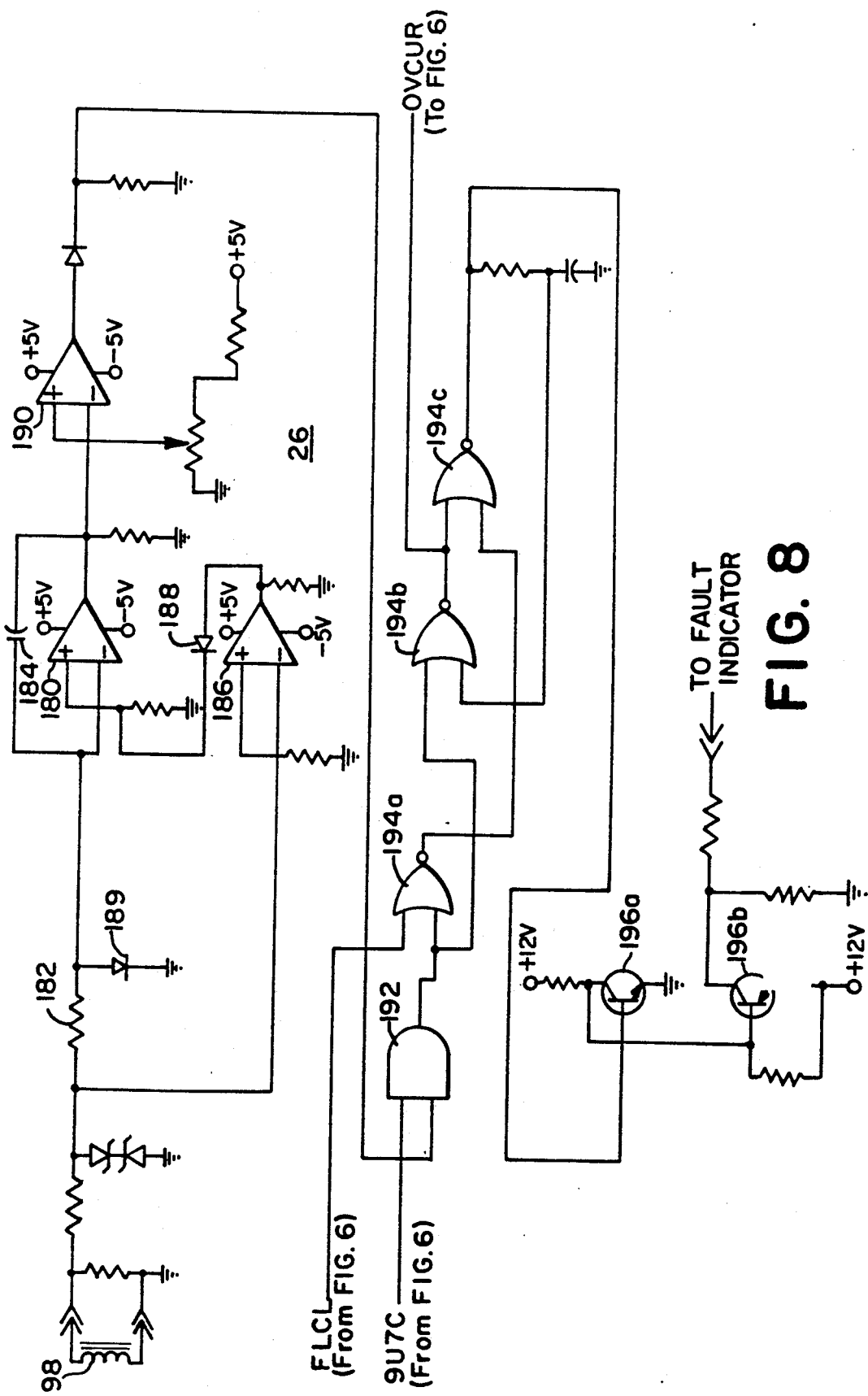
FIG. 8 is a partial schematic diagram of a preferred embodiment of the output current monitor circuit of the motor controller of FIG. 1.

Shown in FIG. 8 is a preferred arrangement for the output current monitor circuit 26. The secondary winding of current transformer 98 (FIG. 5) is connected through resistor 182 to the "−" input of op-amp 180. The output of op-amp 180 is connected through feedback capacitor 184 to the "−" input of op-amp 180. Resistor 182, capacitor 184, and op-amp 180 are connected to operate as an integrating network.

The secondary of current transformer 98 is also connected to the "−" input of op-amp 186, the output of which is connected through diode 188 to the "+" input of op-amp 180. The foregoing arrangement results in integration of only the positive polarity portion of the alternating waveform of the load current. Since the entire load-current waveform is input to the op-amp 186 which has no feedback loop, op-amp 186 produces a square wave which is symmetrically bipolar, but 180 degrees out of phase with the load-current. The positive portion of the output of op-amp 186, which corresponds to the negative portion of the load-current waveform, changes the state of the op-amp 180 thereby causing the capacitor 184 to discharge through the diode 189 until the next positive-going portion of the load-current waveform.

The output of the integrating network is input to the "−" terminal of comparator 190 which is set to provide a logic one or high when the load current exceeds 50 amperes. The output of comparator 190 is connected to one of the inputs of AND-gate 192, the other input being connected to receive the start-up overcurrent delay signal 9U7C of FIG. 6. The output of AND-gate 192 is connected to the inputs of NOR-gates 194a and 194b, the outputs of which are connected to the inputs of NOR-gate 194c to form a latching network similar to that described above for the input voltage monitor circuit shown in FIG. 7. The second input of NOR-gate 194a is connected to receive the fault clear signal FLCL shown in FIG. 6. The output of NOR-gate 194b is connected to the counter enable circuit 108, also shown in FIG. 6, to provide the output overcurrent indicating signal OVCUR thereto. The output of NOR-gate 194c is connected to the transistors 196a and 196b to provide a 12 volt signal to a fault indicator located in the external logic unit 30.

Figure 9:
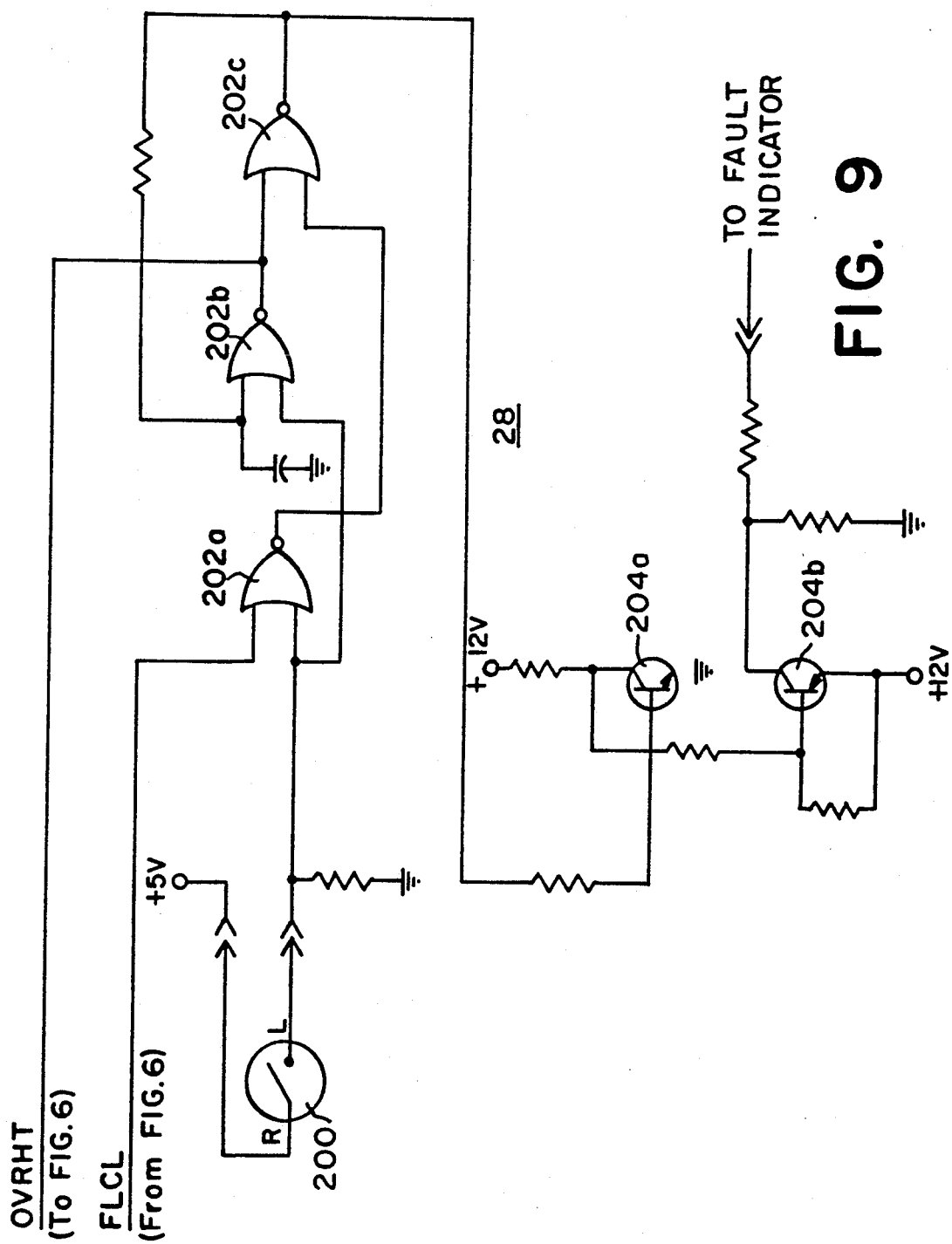
FIG. 9 is a partial schematic diagram of a preferred embodiment of the overheat monitor circuit of the motor controller of FIG. 1.

Referring now to FIG. 9 there is shown a preferred arrangement for the overheat monitor circuit 28. A thermostat 200 is located on a heat sink in the motor controller according to the present invention. The bridge rectifier module 40 and the bipolar switching transistors 94a–94f are preferably mounted on the same heat sink. Thermostat 200 has one terminal connected to the +5 volt power supply. The 20 other terminal of thermostat 200 is connected to one of the inputs of NOR-gate 202a, the other input being connected to receive the fault clear signal FLCL. The NOR-gates 202a, 202b, and 202c are connected in a similar latching arrangement to those described with respect to the input voltage monitor circuit 24 and the output current monitor circuit 26. The output of NOR-gate 202b is the overtemperature condition signal OVRHT which is provided to the counter enable circuit 108 shown in FIG. 6. The output of NOR-gate 202c is provided to the transistor network comprising transistors 204a and 204b which are connected to provide a 12 volt signal to an external fault indicator located in the external logic unit 30.

Figure 10:
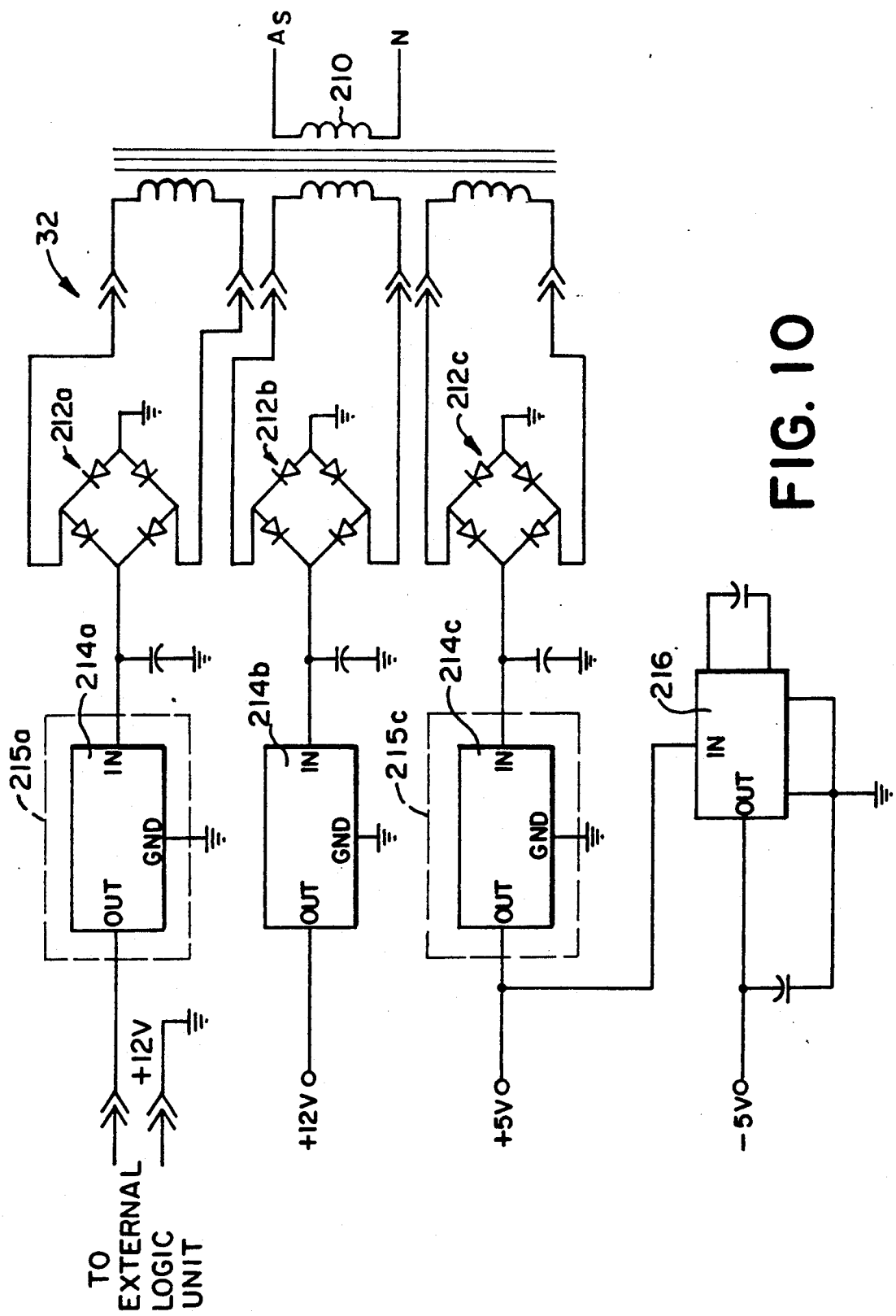
FIG. 10 is a partial schematic diagram of a preferred embodiment of the main power supply of the motor controller of FIG. 1.

Shown in FIG. 10 is a preferred embodiment of the main power supply 32 for the motor controller according to the present invention. One phase of the ac source voltage, preferably the A-phase, is stepped down through transformer 210, the secondary windings of which are connected across the bridge rectifiers 212a, 212b, and 212c. The output terminals of the bridge rectifiers 212a, 212b, and 212c are connected to the input terminals of voltage regulators 214a, voltage regulators 214a, 214b, and 214c provide the desired dc voltage. A voltage inverter 216 converts the +5 volts dc output of voltage regulator 214c to −5 volts dc for use by various circuits in the motor controller according to the present invention.

Figure 11:
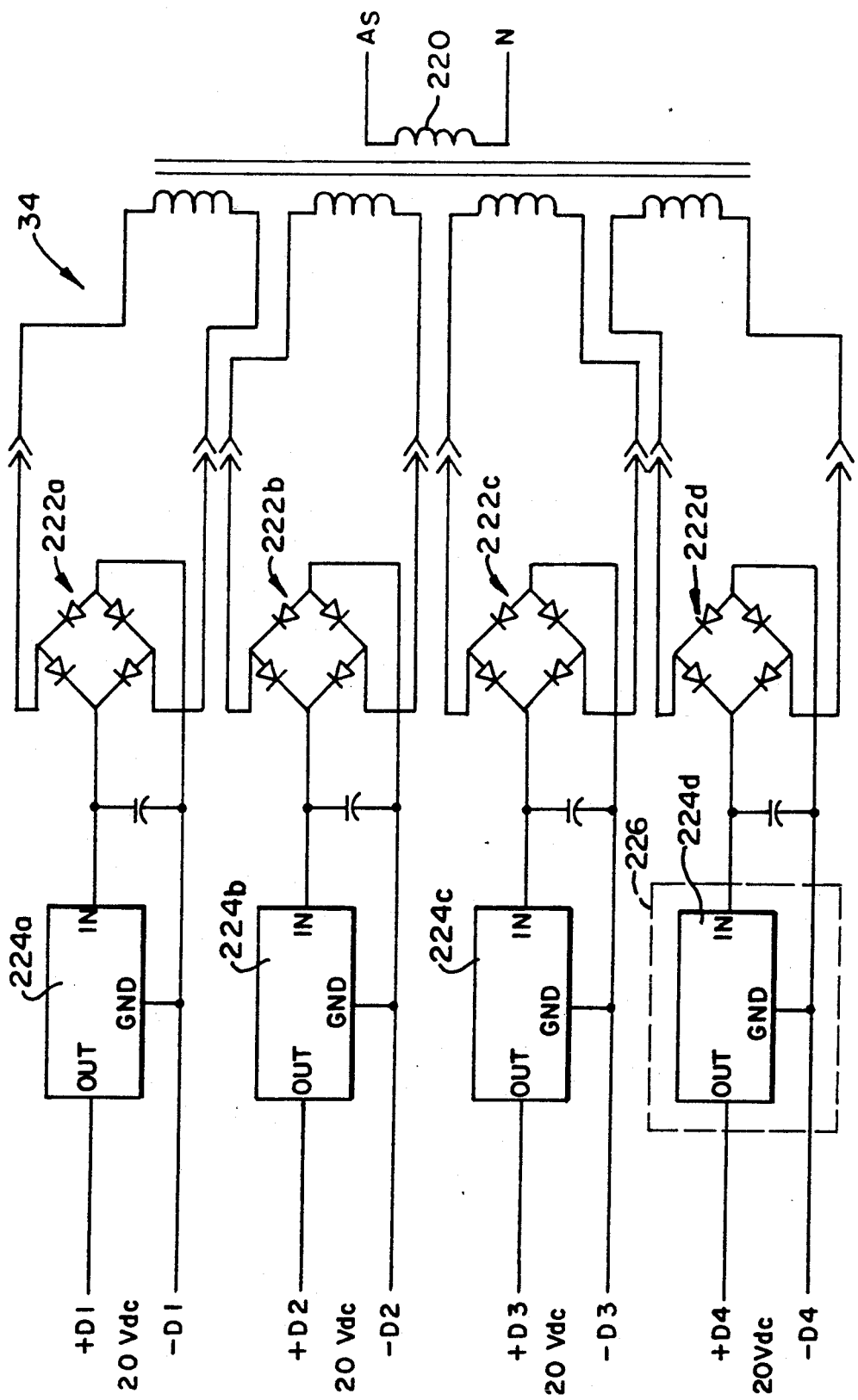
FIG. 11 is a partial schematic diagram of a preferred embodiment of the switch driver power supply of the motor controller of FIG. 1.

Referring now to FIG. 11 there is shown a preferred arrangement for the switch driver power supply 34. The primary of step down transformer 220 is connected to one phase of the ac source voltage. The secondaries of transformer 220 are connected across the bridge rectifiers 222a, 222b, 222c, and 222d. The rectified voltage of the bridge rectifiers 222a, 222b, 222c, and 222d is regulated by means of the voltage regulators 224a, 224b, 224c, and 224d. It is noted that the 20 volts dc output of each of the voltage regulators 224a, 224b, 224c, and 224d does not have a ground reference, but floats with the system voltage.

Some of the many novel features and advantages of the present invention are now apparent in view of the foregoing description. For example, a motor controller has been described which is constructed to receive an ac source voltage having a frequency within a wide frequency range and to automatically generate an alternating polarity load-voltage having an essentially fixed frequency, that is independent of the frequency of the source voltage. The motor controller includes a dc—ac inverter which operates in accordance with coded instructions stored in a crystal-controlled EPROM to provide a precise load-voltage frequency.

It will be recognized by those skilled in the art that changes or modifications may be made to the above-described embodiment without departing from the broad inventive concepts of the invention. For example, it is readily apparent that the motor controller according to the present invention can be used on single phase as well as polyphase ac equipment. It is understood, therefore, that the invention is not limited to the particular embodiment which is described, but is intended to cover all modifications and changes within the scope and spirit of the invention as defined in the appended claims.

```
10  'PROM PROGRAM 5/31/91 TITLED EPROM3.BAS.START-UP
    DUTY FACTOR 30/180
20  'STEADY-STATE DUTY FACTOR=119/180
30  'A=ADDRESS,S=CHECKSUM
40  A=0:S=0
50  OPEN "O",#1,"C:\EPROM\PROMPR03.DAT"
60  '0 ADDRESS POSITION-AT REST-
70  PRINT #1,CHR$(2);
80  A=A:S=+2
90  'THE VARIABLE [REPEAT] IS USED TO GO THRU THE
    START-UP ROUTINE 30 TIMES
100 FOR REPEAT=1 TO 30
110 FOR X=0 TO 29
120 PRINT #1,CHR$(138);CHR$(138);
130 A=A+2:S=S+276
140 NEXT X
150 FOR X=30 TO 59
160 PRINT#1,CHR$(146);CHR$(146);
170 A=A+2:S=S+292
180 NEXT X
190 FOR X=60 TO 89
200 PRINT #1,CHR$(22);CHR$(22);
210 A=A+2:S=S+44
220 NEXT X
230 FOR X=90 TO 119
240 PRINT #1,CHR$(134);CHR$(134);
```

```
250 A=A+2:S=S+268
260 NEXT X
270 FOR X=120 TO 149
280 PRINT #1,CHR$(162);CHR$(162);
290 A=A+2:S=S+324
300 NEXT X
310 FOR X=150 TO 179
320 PRINT #1,CHR$(38);CHR$(38);
330 A=A+2:S=S+76
340 NEXT X
350 FOR X=180 TO 209
360 PRINT#1,CHR$(70);CHR$(70);
370 A=A+2:S=S+140
380 NEXT X
390 FOR X=210 TO 239
400 PRINT#1,CHR$(98);CHR$(98);
410 A=A+2:S=S+196
420 NEXT X
430 FOR X=240 TO 269
440 PRINT #1,CHR$(42);CHR$(42);
450 A=A+2:S=S+84
460 NEXT X
470 FOR X=270 TO 299
480 PRINT #1,CHR$(74);CHR$(74);
490 A=A+2:S=S+148
500 NEXT X
510 FO. X=.00 TO 329
520 PRINT #1,CHR$(82);CHR$(82);
530 A=A+2:S=S+164
540 NEXT X
550 FOR X=330 TO 359
560 PRINT #1,CHR$(26);CHR$(26);
570 A=A+2:S=S+52
580 NEXT X
590 NEXT REPEAT
600 AST=A:SST=S
610 'THIS IS THE END OF THE START-UP
620 'START OF STEADY-STATE
```

```
630 'BUMPS HAVE BEEN REMOVED TO INCREASE VOLTAGE
640 FOR X=0 TO 4
650 PRINT #1,CHR$(90);
660 A=A+1:S=S+90
670 NEXT X
680 PRINT #1,CHR$(26);
690 A=A+1:S=S+26
700 FOR X=6 TO 64
710 PRINT #1,CHR$(154);
720 A=A+1:S=S+154
730 NEXT X
740 PRINT #1,CHR$(146);
750 A=A+1:S=S+146
760 FOR X=66 TO 124
770 PRINT #1,CHR$(150);
780 A=A+1:S=S+150
790 NEXT X
800 PRINT #1,CHR$(134);
810 A=A+1:S=S+134
820 FOR X=126 TO 184
830 PRINT #1,CHR$(166);
840 A=A+1:S=S+166
850 NEXT X
860 PRINT #1,CHR$(38);
870 A=A+1:S=S+38
880 FOR X=186 TO 244
890 PRINT #1,CHR$(102);
900 A=A+1:S=S+102
910 NEXT X
920 PRINT #1,CHR$(98);
930 A=A+1:S=S+98
940 FOR X=246 TO 304
950 PRINT #1,CHR$(106);
960 A=A+1:S=S+106
970 NEXT X
980 PRINT #1,CHR$(74);
990 A=A+1:S=S+74
1000 FOR X=306 TO 358
```

```
1010 PRINT #1,CHR$(90);
1020 A=A+1:S=S+90
1030 NEXT X
1040 PRINT #1,CHR$(88);
1050 A=A+1:S=S+88
1060 'THIS IS THE END OF STEADY-STATE.
1070 'IT IS REPEATED UNTIL STOPPED.
1080 LPRINT"SUMMARY OF ADDRESSES & CHECKSUM"
1090 LPRINT:LPRINT
1100 W=AST
1110 GOSUB 1310
1120 LPRINT"LAST START UP ADDRESS (DEC)=";AST;" HEX=";H$
1130 W=SST
1140 GOSUB 1310
1150 LPRINT"START-UP CHECKSUM (DEC)=";SST;" HEX=";H$
1160 LPRINT
1170 W=A
1180 GOSUB 1310
1190 LPRINT"FINAL ADDRESS (DEC)=";A;" HEX=";H$
1200 W=S
1210 GOSUB 1310
1220 LPRINT"FINAL CHECKSUM (DEC)=";S;" HEX=";H$
1230 LPRINT:LPRINT:LPRINT"     IMPORTANT!"
1240 LPRINT"WHEN DATA IS LOADED INTO EPROM BUFFER, BE SURE TO CHANGE THE"
1250 LPRINT"LAST ENTRY TO '00'. THE LAST ENTRY IN THE 'BASIC' DATA FILE"
1260 LPRINT"IS AN 'END OF FILE' MARKER & WHICH IS NOT '00'.
1270 LPRINT
1280 LPRINT
1290 LPRINT" THE DATA FILE GENERATED BY THIS PROGRAM IS CALLED C:\EPROM\PROMPRO3.DAT.
1300 END
1310 'SUBROUTINE FOR FINDING HEX NUMBERS UP TO 1,048,575 (FFFFF).
```

```
1320 'INPUT: W OUTPUT: H$
1330 S4=INT(W/65536!)
1340 R4=W-S4*65536!
1350 S3=INT(R4/4096)
1360 R3=R4-S3*4096
1370 S2=INT(R3/256)
1380 R2=R3-S2*256
1390 S1=INT(R2/16)
1400 R1=R2-S1*16
1410 S0=R1
1420 IF S4=15 THEN S4$="F":GOTO 1780
1430 IF S4=14 THEN S4$="E":GOTO 1490
1440 IF S4=13 THEN S4$="D":GOTO 1490
1450 1F S4=12 THEN S4$="C":GOTO 1490
1460 IF S4=11 THEN S4$="B":GOTO 1490
1470 IF S4=10 THEN S4$="A":GOTO 1490
1480 S4$=STR$(S4)
1490 IF S3=15 THEN S3$="F":GOTO 1560
1500 IF S3=14 THEN S3$="E":GOTO 1560
1510 IF S3=13 THEN S3$="D":GOTO 1560
1520 IF S3=12 THEN S3$="C":GOTO 1560
1530 IF S3=11 THEN S3$="B":GOTO 1560
1540 IF S3=10 THEN S3$="A":GOTO 1560
1550 S3$=STR$(S3)
1560 IF S2=15 THEN S2$="F":GOTO 1630
1570 IF S2=14 THEN S2$="E":GOTO 1630
1580 IF S2=13 THEN S2$="D":GOTO 1630
1590 IF S2=12 THEN S2$="C":GOTO 1630
1600 IF S2=11 THEN S2$="B":GOTO 1630
1610 IF S2=10 THEN S2$="A":GOTO 1630
1620 S2$=STR$(S2)
1630 IF S1=15 THEN S1$="F":GOTO 1700
1640 IF S1=14 THEN S1$="E":GOTO 1700
1650 IF S1=13 THEN S1$="D":GOTO 1700
1660 IF S1=12 THEN S1$="C":GOTO 1700
1670 IF S1=11 THEN S1$="B":GOTO 1700
1680 IF S1=10 THEN S1$="A":GOTO 1700
1690 S1$=STR$(S1)
```

```
1700 IF S0=15 THEN S0$="F":GOTO 1780
1710 IF S0=14 THEN S0$="E":GOTO 1780
1720 IF S0=13 THEN S0$="D":GOTO 1780
1730 IF S0=12 THEN S0$="C":GOTO 1780
1740 IF S0=11 THEN S0$="B":GOTO 1780
1750 IF S0=10 THEN S0$="A":GOTO 1780
1760 IF S0=0 THEN S0$="0":GOTO 1780
1770 S0$=STR$(S0)
1780 H$=S4$+S3$+S2$+S1$+S0$
1790 RETURN
```

SUMMARY OF ADDRESSES & CHECKSUM

LAST START-UP ADDRESS (DEC)= 21600 HEX= 0 5 4 60

START-UP CHECKSUM (DEC)= 1857602 HEX= 28 5 8 4 2

FINAL ADDRESS (DEC)= 21960 HEX= 0 5 5C 8

FINAL CHECKSUM (DEC)= 1903428 HEX= 29 0B 4 4

IMPORTANT!

WHEN DATA IS LOADED INTO EPROM BUFFER, BE SURE TO

CHANGE THE LAST ENTRY TO '00'. THE LAST ENTRY IN THE

'BASIC' DATA FILE IS AN 'END OF FILE' MARKER & WHICH

IS NOT '00'.

THE DATA FILE GENERATED BY THIS PROGRAM IS CALLED

C:\EPROM\PROMPR03.DAT.

What is claimed is:

1. An ac motor controller comprising:

ac to dc conversion means for converting an alternating polarity, source-voltage to a first dc voltage having a positive polarity and a second dc voltage having a negative polarity relative to said first dc voltage, said first and second dc voltages being substantially fixed relative to said source-voltage and said source-voltage having a source-frequency that is within a wide frequency range; and dc to ac inversion means for generating an alternating polarity load-voltage from said first and second dc voltages, said dc to ac inversion means being configured to automatically generate said load-voltage at a substantially fixed load-frequency, independently of the source-frequency of the source-voltage and independently of the speed of an ac motor electrically connected to the ac motor controller.

2. A motor controller as recited in claim 1 wherein the dc to ac inversion means comprises:

first and second power switches connected in series between said first and second dc voltages, said first and second power switches being interconnected at a first interconnection point;

third and fourth power switches connected in series between said first and second power switches, said third and fourth power switches being interconnected at a second interconnection point;

control means for closing or opening each of said power switches in a controlled manner such that the voltage across said first and second interconnection points alternates in polarity at the substantially fixed, load-frequency.

3. A motor controller as recited in claim 2 wherein said control means comprises:

a memory device having a plurality of storage locations for storing a plurality of data words, each data word being stored at one of said storage locations, each of said storage locations having a unique address, and each data word containing a switch-condition-code that defines an open or closed condition for one of said power switches;

an address-code generating means for generating a sequence of address codes, each address code corresponding to an address of one of the storage locations of said memory device where a data word is stored, whereby the data words are accessed in a desired sequence;

switch operating means responsive to the switch-condition-codes for causing each of said switched to open or close; and communication means operatively connected between said memory device and said switch operating means, for communicating the switch-condition-codes to said switch operating means, whereby the power switches are opened or closed in the desired sequence.

4. A motor controller as recited in claim 3 wherein said address-code generating means comprises:

clock signal generating means for generating a clock signal having a preselected clock-frequency; and counting means responsive to said clock-frequency for generating a sequence of count-signals, each count-signal representing a number in a numerical sequence, and each of said numbers corresponding to one of the address-codes.

5. An ac motor controller as recited in claim 4 wherein said clock signal generating means comprises:

a crystal controlled oscillator for generating a primary signal having a substantially fixed, preselected frequency; and a dividing circuit responsive to the primary signal for dividing the frequency of the primary signal to provide the clock-signal.

6. An ac motor controller for automatically supplying an alternating polarity load-voltage to a load at a substantially fixed load-frequency comprising:

ac to dc conversion means for converting an alternating polarity, source-voltage to a first dc voltage having a positive polarity and a second dc voltage having a negative polarity relative to said first dc voltage, said first and second dc voltages being substantially fixed relative to said source-voltage and said source-voltage having a source-frequency that is within a wide frequency range;

first and second power switches connected in series between said first and second dc voltages, said first and second power switches being interconnected at a first interconnection point;

third and fourth power switches connected in series between said first and second dc voltages and in parallel with said first and second power switches, said third and fourth power switches being interconnected at a second interconnection point;

a read only memory having a plurality of storage locations for storing a plurality of data words, each data word being stored at one of said storage locations, each of said storage locations having a unique address, and each data word containing a switch-condition-code for each of said power switches, said switch-condition-code defining an open or closed condition for one of said power switches;

means for retrieving and outputting said data words in a predefined sequence and at a predefined frequency; and means responsive to said data words for closing or opening the power switches in the predefined sequence and at the predefined frequency, whereby the voltage across said first and second interconnection points alternates in polarity at the predefined frequency.

7. A motor controller as recited in claim 6 wherein said retrieving and outputting means comprises address-code generating means for generating a sequence of address-codes, each address code corresponding to an address of one of the storage locations of said read only memory where a data word is stored.

8. A motor controller as recited in claim 7 wherein said address-code generating means comprises:

clock signal generating means for generating a clock signal having a preselected clock-frequency; and counting means responsive to said clock-frequency for generating a sequence of count-signals, each count-signal representing a number in a numerical sequence, and each of said numbers corresponding to one of the address-codes.

9. A motor controller as recited in claim 6 wherein the plurality of data words stored in said read only memory includes a first sequence of data words for defining the open/closed conditions of the power switches during start-up of the load and a second sequence of data words for defining the open/closed conditions of the power switches during steady-state operation of the load, said second sequence of data words being programmed to cause the motor controller to provide a steady-state load-voltage; and said retrieving and outputting means comprises a first logic circuit for selecting the first sequence of data words for retrieval and output, in response to a start signal from an external source.

10. A motor controller as recited in claim 9 wherein the first sequence of data words are programmed to cause the motor controller to provide a start-up load-voltage having a reduced magnitude and a reduced frequency relative to the steady-state load-voltage in order to limit in-rush current to the load during start-up of the load.

11. A motor controller as recited in claim 9 wherein said retrieving and output means further comprises means for selecting the second sequence of data words for retrieval and output during steady-state operation of the load.

12. An ac motor controller comprising:

ac to dc conversion means for converting an alternating polarity, source-voltage to a first dc voltage having a positive polarity and a second dc voltage having a negative polarity relative to said first dc voltage, said first and second dc voltages being substantially fixed relative to said source-voltage and said source-voltage having a source-frequency that is within a wide frequency range;

dc to ac inversion means for generating an alternating polarity load-voltage from said first and second dc voltages, said dc to ac inversion means being configured to automatically generate said load-voltage at a substantially fixed load-frequency, independently of the source-frequency of the source-voltage and independently of the speed of an ac motor electrically connected to the ac motor controller; and fault detection means for detecting a fault condition in the motor controller during operation thereof and generating a fault signal when a fault condition is detected.

13. A motor controller as recited in claim 12 wherein said fault detection means comprises a source-voltage monitoring circuit connected to receive the source-voltage and responsive thereto for providing a first fault signal when the source-voltage is above a preselected maximum magnitude or below a predetermined minimum magnitude.

14. A motor controller as recited in claim 13 wherein said fault detection means comprises an output current monitoring circuit connected to receive load-current that is output by the motor controller and responsive thereto for providing a second fault signal when the load-current exceeds a predetermined limit.

15. A motor controller as recited in claim 14 wherein said fault detection means comprises a temperature monitoring circuit for sensing the temperature of the motor controller and in response thereto, providing a third fault signal when the motor controller temperature exceeds a predetermined limit.

16. An ac motor controller for automatically supplying an alternating polarity load-voltage to a load at a substantially fixed load-frequency comprising:

ac to dc conversion means for converting an alternating polarity, source-voltage to a first dc voltage having a positive polarity and a second dc voltage having a negative polarity relative to said first dc voltage, said first and second dc voltages being substantially fixed relative to said source-voltage and said source-voltage having a source-frequency that is within a wide frequency range;

first and second power switches connected in series between said first and second dc voltages, said first and second power switches being interconnected at a first interconnection point;

third and fourth power switches connected in series between said first and second dc voltages and in parallel with said first and second power switches, said third and fourth power switches being interconnected at a second interconnection point;

fifth and sixth power switches connected in series between said first and second dc voltages and in parallel with said first and second and said third and fourth power switches, said fifth and sixth power switches being interconnected at a third interconnection point;

a read only memory having a plurality of storage locations for storing a plurality of data words, each data word being stored at one of said storage locations, each of said storage locations having a unique address, and each data word containing a switch-condition-code for each of said power switches, said switch-condition-code defining an open or closed condition for one of said power switches;

means for retrieving and outputting said data words in a predefined sequence and at a predefined frequency; and means responsive to said data words for closing or opening the power switches in the predefined sequence and at the predefined frequency, whereby the voltage across said first, second, and third interconnection points alternates in polarity at the predefined frequency in a phase relationship to provide three-phase ac load-voltage.

17. A method for automatically generating an alternating polarity load-voltage having a preselected frequency from an alternating polarity source-voltage, independently of the frequency of the source-voltage, said method comprising the steps of receiving an alternating polarity source-voltage having a frequency;

converting the alternating polarity source-voltage to a first dc voltage having a positive polarity and a second dc voltage having a negative polarity relative to said first dc voltage, said first and second dc voltages being substantially fixed relative to said source-voltage and;

storing a plurality of data words on a memory device having a plurality of storage locations, each data word being stored at one of said storage locations, each of said storage locations having a unique address, and each data word containing a switch-condition-code that defines an open or closed condition for a power switch;

retrieving the data words from said memory device in a predefined sequence and at a preselected frequency; and generating an alternating polarity load-voltage from the first and second dc voltages by opening or closed power switches connected between the first and second dc voltages at the preselected frequency and in accordance with the predefined sequence of data words.

18. A method as recited in claim 17 wherein the step of retrieving the data words comprises the steps of generating a clock signal having a plurality of periods, said clock signal being generated at the preselected frequency, independently of the source-voltage frequency; and generating a sequence of address-codes at the preselected frequency, each address-code corresponding to an address of one of the storage locations of said memory device where a data word is stored.

19. A method as recited in claim 18 wherein the step of generating the sequence of address-codes comprises the steps of counting the periods of said clock-signal and then generating a sequence of count-signals, each count-signal representing a number in a numerical sequence, and each of said numbers corresponding to one of the address-codes.

20. A method as recited in claim 19 wherein the step of storing the plurality of data words comprises the steps of storing a first sequence of data words for defining the open/closed conditions of the power switches during start-up of the load; and storing a second sequence of data words for defining the open/closed conditions of the power switches during steady-state operation of the load, said second sequence of data words being programmed to cause the motor controller to provide a steady-state load-voltage.

21. A method as recited in claim 20 wherein the step of retrieving the data words comprises the steps of receiving a start signal for energizing the load; and selecting the first sequence of data words for retrieval from the memory device.

* * * * *

UNITED STATES PATENT AND TRADEMARK OFFICE
CERTIFICATE OF CORRECTION

PATENT NO. : 5,227,711  
DATED : July 13, 1993  
INVENTOR(S) : GRUENSFELDER

Page 1 of 2

It is certified that error appears in the above-indentified patent and that said Letters Patent is hereby corrected as shown below:

On the title page, item [54] and column 1, line 2, change the title to read --AC MOTOR CONTROLLER FOR AUTOMATICALLY PROVIDING AC POWER OUTPUT AT A SUBSTANTIALLY FIXED FREQUENCY--

Column 4:
    Line 56, "QO" should be --QC--

Column 5:
    Line 18, "OK" should be --CK--

Column 9:
    Line 9, "A,," should be --$A_s$--
    Line 16, "B," should be --$B_s$--

UNITED STATES PATENT AND TRADEMARK OFFICE
CERTIFICATE OF CORRECTION

PATENT NO. : 5,227,711
DATED : July 13, 1993
INVENTOR(S) : GRUENSFELDER

It is certified that error appears in the above-indentified patent and that said Letters Patent is hereby corrected as shown below:

```
    Column 24, line 67,  "predetermined" should be
--preselected--

Column 25, line 6,   "predetermined" should be
--preselected--

Column 25, line 12,  "predetermined" should be
--preselected--
```

Signed and Sealed this

Twentieth Day of February, 1996

Attest:

Attesting Officer

BRUCE LEHMAN

Commissioner of Patents and Trademarks